United States Patent [19]
McMaster et al.

[11] Patent Number: 5,438,787
[45] Date of Patent: Aug. 8, 1995

[54] GUN STORAGE AND RAPID REMOVAL MOUNT

[75] Inventors: David A. McMaster; Ronald J. Swanson, both of Los Angeles, Calif.

[73] Assignee: Pro-Tech Design & Manufacturing, Inc., Los Angeles, Calif.

[21] Appl. No.: 330,987

[22] Filed: Oct. 28, 1994

[51] Int. Cl.⁶ .......................... F41C 27/00; B60R 7/14
[52] U.S. Cl. ........................................ 42/106; 211/64; 224/913
[58] Field of Search ............................ 42/106; 211/64; 224/42.45 R, 913

[56] References Cited

U.S. PATENT DOCUMENTS

| | | | |
|---|---|---|---|
| 3,802,612 | 4/1974 | Smith | 211/64 |
| 4,120,436 | 10/1978 | Burch | 211/64 |
| 4,364,499 | 12/1982 | McCue | 224/42.45 R |
| 4,560,134 | 12/1985 | Klein | 224/913 |
| 4,747,280 | 5/1988 | Shaw | 211/64 |
| 5,129,563 | 7/1992 | Dillon | 224/42.45 R |
| 5,350,094 | 9/1994 | Morford | 224/42.45 R |

Primary Examiner—Stephen C. Bentley
Assistant Examiner—Theresa M. Wesson
Attorney, Agent, or Firm—Allan M. Shapiro

[57] ABSTRACT

The gun storage and rapid removal mount of this invention is for securely retaining a shotgun or the like against unauthorized removal with the mount providing for rapid removal by authorized persons. It comprises a trigger guard cup and a forward lock clamp. The lock clamp engages the barrel and a magazine tube just forward of the shotgun receiver to prevent forward motion of the shotgun in the mount. The trigger guard cup prevents rearward motion. The lock clamp is both lock- and spring-retained. When its lock is released, the gun can be rotated out of the clamp against spring force. The spring also permits reinsertion of the shotgun into position against the spring force.

19 Claims, 3 Drawing Sheets

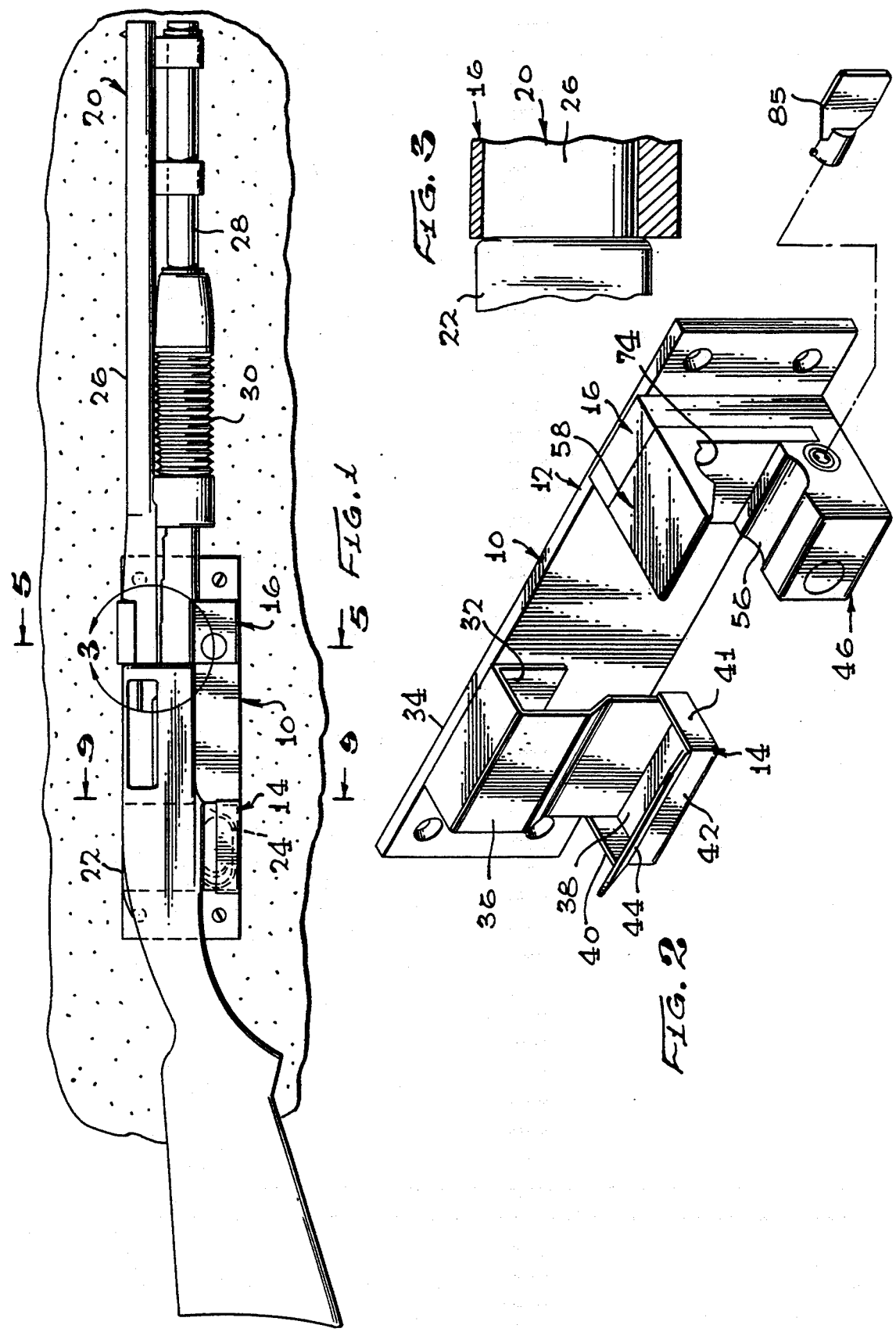

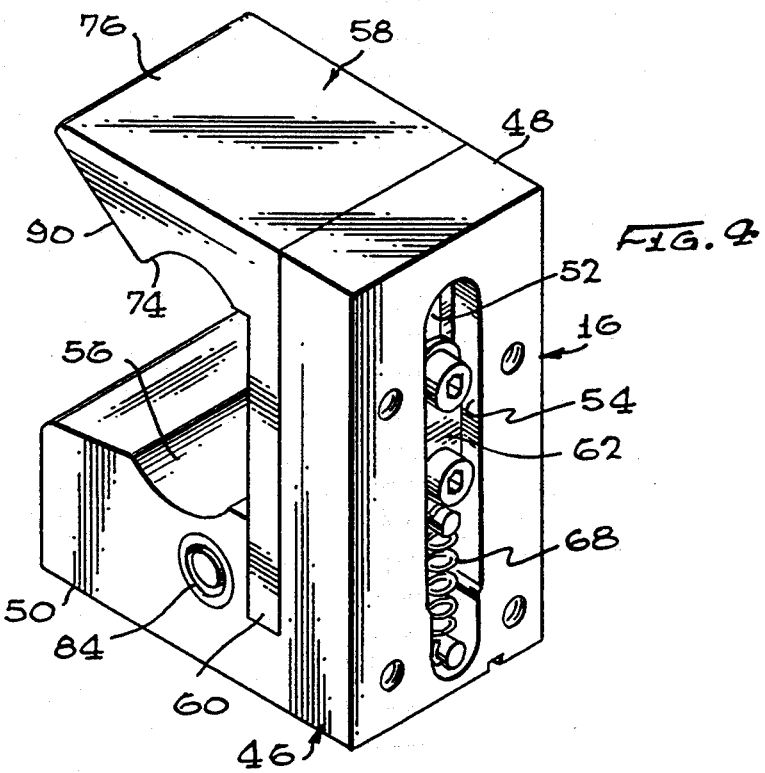
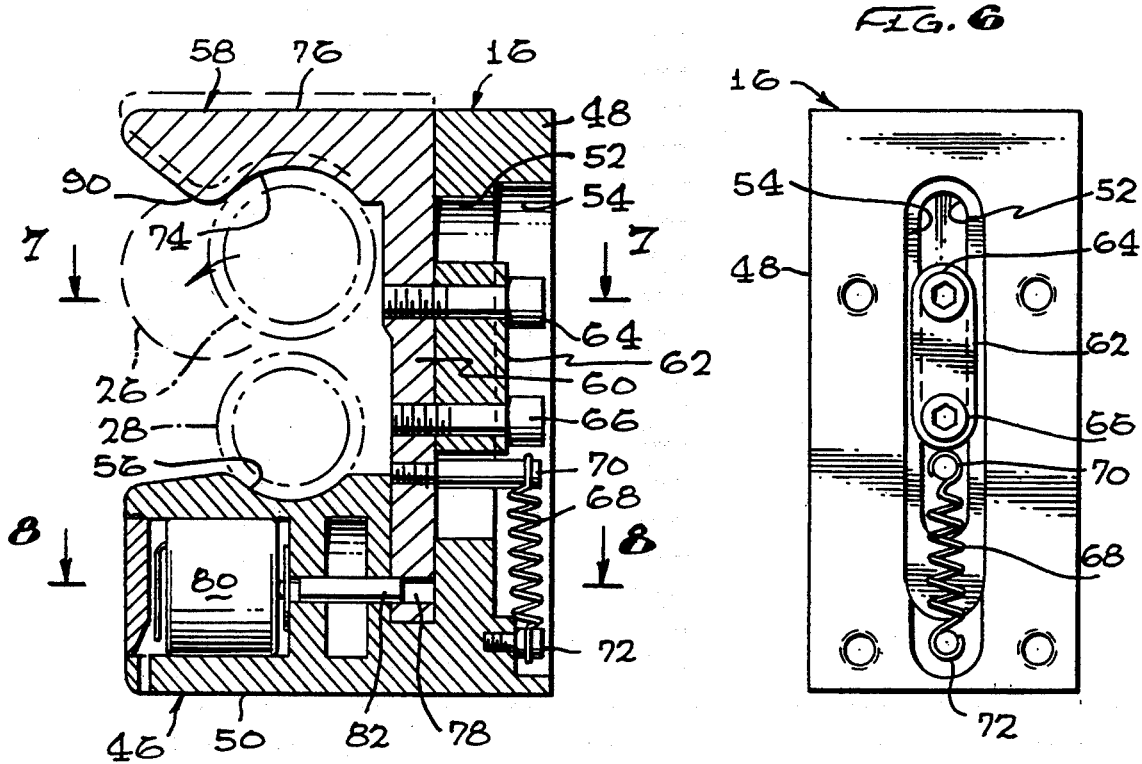

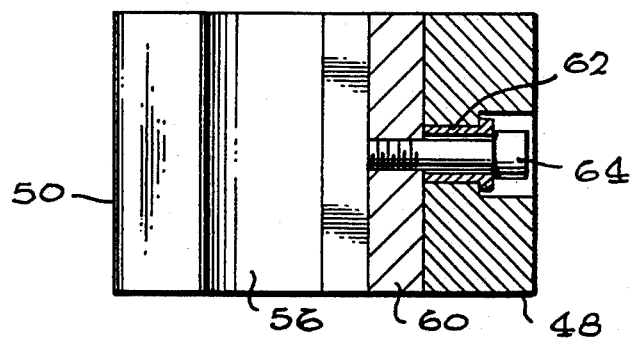
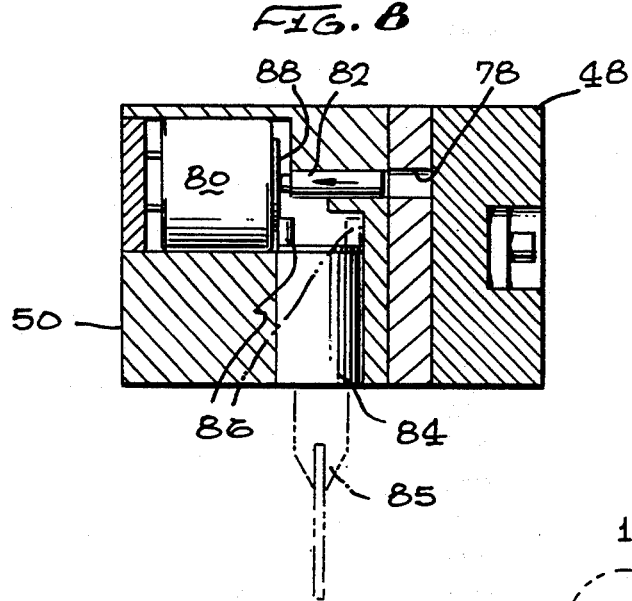
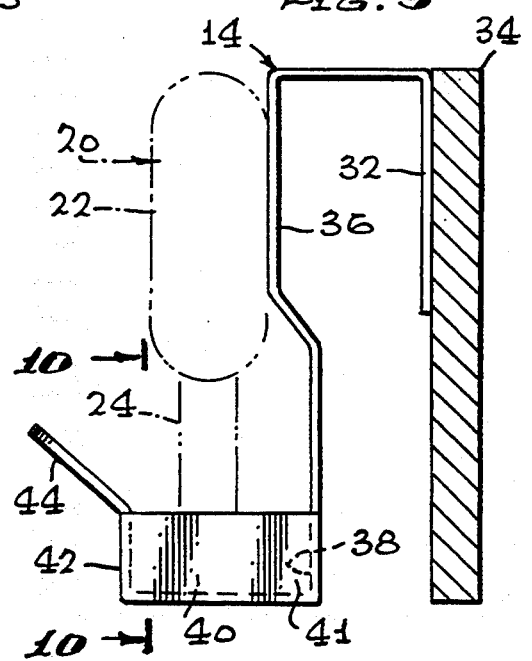
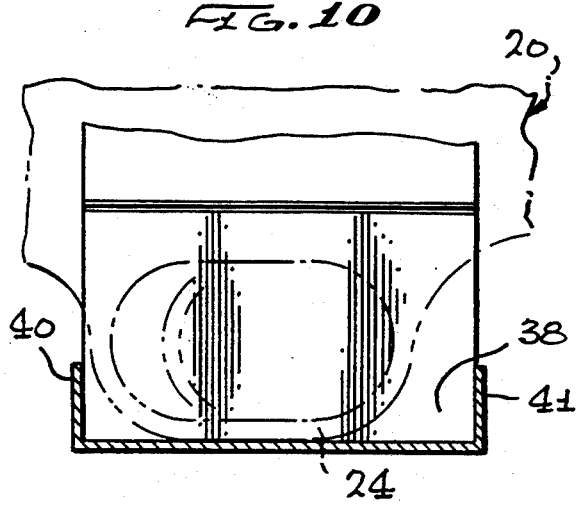

GUN STORAGE AND RAPID REMOVAL MOUNT

FIELD OF THE INVENTION

This invention is directed to a gun storage and rapid removal mount for releasably locking a shotgun or the like in place for security and for release by authorized users.

BACKGROUND OF THE INVENTION

In modern police practice, many police officers prefer to have a pump-action shotgun available to them. The shotgun must be quickly available. Thus, it cannot be carried in the trunk of the police vehicle. However, the shotgun must be secure against unauthorized removal. In modern practice, the shotgun is stood on the floor on the passenger side of the transmission hump of the police vehicle and is releasably clamped to the right-hand dash-board. The clamp is such as to make the shotgun secure until released by an authorized person.

Modern police cars have increasing amounts of equipment. The center dashboard and center console are occupied by radio and computer equipment. Modern police cars are also equipped with airbags, both on the driver's side and on the passenger's side. It is this airbag equipment on the passenger's side that requires that the shotgun mounting be moved to another location. Other possible locations include mounting on the security divider behind the front seats of the police car and under the roof and headliner in a position away from the police officers' heads. There is need for a secure gun storage mount usable in these locations and from which the gun can be rapidly removed.

SUMMARY OF THE INVENTION

In order to aid in the understanding of this invention, it can be stated in essentially summary form that it is directed to a gun storage and rapid removal mount particularly suited for the secure mounting of shotguns and the like. The mount comprises a trigger guard cup to receive the trigger guard and prevent rearward movement of the gun and a forward clamp to releasably engage the barrel of the gun forward of the receiver to prevent forward and outward movement of the gun. The forward lock clamp, when unlocked, still resiliently engages the gun to hold it in place until the gun is withdrawn by physical grasp thereof.

It is thus an object and advantage of this invention to provide a gun storage mount which securely but releasably retains a gun, such as a pump-action shotgun or the like, in secure position until it is released by an authorized user.

It is another object and advantage of this invention to provide a gun mount which provides for rapid removal of the gun from the mount when the mount is unlocked by an authorized user.

It is a further object and advantage of this invention to provide a gun storage mount which releasably retains the gun in position by resilient engagement thereon so that the gun remains in position in its mount until it is withdrawn therefrom by physical grasp thereon.

It is another object and advantage of this invention to provide a gun storage and rapid removal mount which can be both electrically and mechanically unlocked so that the gun can be removed from the mount even on failure of one or the other of the release systems.

It is another object and advantage of this invention to provide a gun storage and rapid removal mount which permits a shotgun or the like to be mounted in a police car without interference with the computer, radio or other electronic equipment or without interference of driver and passenger airbags or other safety equipment.

It is another object and advantage of this invention to provide a gun storage and rapid removal mount which retains the pump-action shotgun in such a position that a round cannot be chambered and the trigger is housed in an inaccessible position while the gun is in the mount to enhance safety.

It is another object and advantage of this invention to provide a gun storage mount which is useful with a variety of different styles of long guns and in a number of different locations, including the home.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a side-elevational view of the gun storage and rapid removal mount of this invention, shown with a pump-action shotgun mounted therein, and with part of the wall shown in other parts broken away.

FIG. 2 is a perspective view thereof.

FIG. 3 is an enlarged side-elevational view, with parts broken away and parts taken in section, as seen generally along the line 3 of FIG. 1.

FIG. 4 is a rear perspective view of the forward lock clamp portion of the mount of this invention.

FIG. 5 is an enlarged section taken generally along the line 5—5 of FIG. 1.

FIG. 6 is a rear elevational view of the lock clamp.

FIG. 7 is a downwardly-looking section taken generally along the line 7—7 of FIG. 5.

FIG. 8 is a downwardly-looking section taken generally along the line 8—8 of FIG. 5.

FIG. 9 is an enlarged rearwardly-looking section, as seen generally along the line 9—9 of FIG. 1.

FIG. 10 is an enlarged section, with parts broken away, taken generally along the line 10—10 of FIG. 9.

DESCRIPTION OF THE PREFERRED EMBODIMENT

The gun storage and rapid removal mount of this invention is generally indicated at 10 in FIGS. 1 and 2. The mount 10 includes a backplate 12 upon which trigger guard cup 14 and forward lock clamp 16 are mounted.

The mount 10 is described as being configured for use with a pump-action shotgun 20, which is shown in side elevation in FIG. 1. The particular features of the shotgun 20 are described so that its cooperation with the mount 10 can be comprehended. It is understood that the mount 10 can be configured in slightly different dimensions so as to receive and lock other types of long guns. The shotgun 10 has a receiver 22 toward the bottom of which is mounted trigger guard 24. The forward end of the receiver butts against forward lock clamp 16, as is seen in FIGS. 1 and 3. Barrel 26 is mounted in the receiver and extends forward through the clamp. Magazine tube 28 is mounted beneath the barrel and is attached to the forward end of the receiver. Pump fore grip 30 is slidably mounted on the magazine tube and is connected to the mechanism in the receiver so that rearward motion of the pump fore grip 30 extracts a round from the chamber in the barrel and ejects it, and forward motion inserts a new round from the magazine tube into the chamber. This rearward followed by forward motion is necessary to chamber a new round. The trigger in the trigger guard is connected into the receiver to cause firing of the shell. Other long guns have similar structures, and it can be appreciated that the mount 10 of this invention can be configured to store and securely mount other configurations of long guns.

Trigger guard cup 14 has a rear lip 32 which is secured to the top of backplate 34 adjacent one end thereof. Extending forward from the rear lip 32, the trigger guard cup 14 extends forward to provide face 36 against which the receiver 22 can lie. Directly below this face is a socket 38 of the cup. The socket is defined by a back end wall 40, a front end wall 41 and a stop wall 42, see FIGS. 2 and 9. The socket is positioned and sized so that, when the gun 20 is in place, it receives the trigger guard. The end wall 40 engages against the back of the trigger guard to prevent rearward motion of the gun. The sloped upper portion 44 of the stop wall 42 is to provide clearance for the receiver as the gun is rotated out of the mount. It is rotated in the counterclockwise direction, as seen in FIG. 9, with the receiver 22 moving away from the face 36. To provide additional clearance space for the trigger guard during such rotation, the lower part of the face 36 is formed closer to the backplate 34. The stop wall 42 and its upper portion 44 are sufficiently tall so that access to the trigger within the trigger guard is made difficult or impossible. Even though the gun 20 is stored without a round in its chamber, this structure inhibits access to the trigger as a double safety effort.

Forward lock clamp 16 is also attached to the backplate 12, as seen in FIG. 2. The forward lock clamp is spaced from the trigger guard cup a sufficient distance so that the receiver abuts the forward lock clamp, as seen in FIGS. 1 and 3. The forward lock clamp 16 is shown in more detail in FIGS. 4, 5 and 6. The forward lock clamp 16 comprises an L-shaped body 46 which has an upwardly extending back panel 48 and a forward lower flange 50. The back panel has an upright slot 52 therethrough and, on the back of the back panel, has an enlarged recess 54 around the slot 52, see FIGS. 4, 5 and 6. The forwardly extending lower flange 50 has a groove 56 therealong extending toward the trigger guard cup which is shaped as a partial cylinder in order to accept the lower surface of the magazine tube 28, as seen in FIG. 5.

Lock arm 58 is L-shaped and is in inverted position, as seen in FIGS. 4 and 5. In this position, its back flange 60 lies against back panel 48. Teebar 62, see FIGS. 5, 6 and 7, lies in slot 52 and has a lip which overlies the slot and extends into recess 54. Teebar 62 is bolted to the back flange 62 by means of machine screws 64 and 66. In this way, the lock arm 58 is constrained to move up and down on body 56 within the limits of slot 52. Lock arm 58 is urged downward with respect to body 46 by means of tension spring 68. The tension spring is engaged on post 70 secured to the lock arm 58 and post 72 secured to body 46. In this way, the lock arm 58 is resiliently urged downward.

In the downward position of the lock arms, the barrel of the gun is received in groove 74 in the head 76 of the lock arm. The shape of the groove and the strength of the spring 68 are such that, when the lock arm is not locked with respect to the body 46, the gun can be removed by rotating the barrel out from under the head 76 to the dashed line position shown in FIG. 5. This raises the lock arm against the spring tension to the dashed line position shown in FIG. 5. However, the spring tension is sufficiently strong that the gun is retained in the mount unless grasped and forcibly removed. The rotation of the gun to the dashed line position in FIG. 5 also aids in removing the trigger guard from its cup, as is evident from FIG. 9.

The gun cannot be removed without raising of the lock arm 58. To restrain the lock arm 58 in its lowered position, back flange 60 is provided with lock hole 78, see FIGS. 5 and 8. Solenoid 80 is mounted within flange 50 and carries lock pin 82, which is aligned with lock hole 78 when the lock arm is in its lowered position shown in FIGS. 5 and 8. The lock pin is resiliently urged to the right to engage in lock hole 78 for the locked condition. However, energization of solenoid 80 withdraws the lock pin from its lock hole to free the lock arm. Energization can be accomplished conveniently by means of a hidden button connected through safety circuitry which permits the solenoid to remain energized for a short period, such as several seconds. During that energized period, the gun can be grasped, rotated and removed from the mount 10.

Should there be an electrical failure which prevents actuation of the solenoid 80, the mount 10 is also provided with a manual unlocking means. Rotating lock 84, see FIG. 8, is mounted inside the forward lower flange 50 and receives an emergency manual key 85, see FIG. 2. The rotating lock carries an eccentric pin 86 which engages behind the armature 88 on the solenoid lock pin. When the lock 84 is rotated by key 85 to the unlocking position, its eccentric pin engages the armature 88 and moves the lock pin 82 out of locking position. The full-line position in FIG. 8 shows this unlocked position. The dashed-line position of the eccentric pin shows the normal position of the rotating lock for when the lock pin is solenoid-withdrawn. To aid in smooth withdrawal of the gun and ease of reinstallation of the gun, the lock arm 58 is provided with a sloped entry surface 90. The sloped surface permits smooth motion. All structural parts are made of sufficiently strong material such as wrought or extruded aluminum. The aluminum can be hard-anodized and Teflon-coated for ease of use and long life without scratching the gun which is mounted therein. When the gun is in the mount, the trigger is inaccessible, the gun cannot be removed except by unlocking, and the pump slide cannot be actuated. Thus, the gun is secure and safe in its mounting.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A gun storage and rapid removal mount comprising:

a cup for receiving the trigger guard of a long gun; and a forward lock clamp for releasably engaging on a long gun forward of and in contact with the front of the receiver of the long gun so that said forward lock clamp prevents forward motion of the long gun and said trigger guard cup prevents rearward motion of the long gun, said forward lock clamp having a body and a head movable with respect to said body, said body and said head each having a groove therein to receive the long gun forward of its receiver and to restrain the long gun until said head of said lock clamp is moved away from said body of said forward lock clamp.

2. The mount of claim 1 wherein said head is mounted on a back flange and said back flange is slidably mounted with respect to said body.

3. The mount of claim 2 wherein said body has an upstanding back panel and said back flange is slidably positioned with respect to said back panel.

4. The mount of claim 3 wherein one of said back panel and said back flange has a slot therein and the other of said back flange and back panel has a slide secured thereto and engaging in said slot.

5. The mount of claim 4 wherein said slot is a tee slot and said slide is a teebar.

6. The mount of claim 5 wherein a lock releasably locks said back flange with respect to said back panel.

7. The mount of claim 6 wherein said lock is a pin engaged between said body and said back flange, said pin being solenoid-actuated.

8. The mount of claim 6 wherein a pin engages between said body and said back panel to lock said head with respect to said body, said pin being key-lock actuated.

9. The mount of claim 8 wherein said pin is also solenoid-actuated.

10. A mount for securing a long gun and rapidly releasing the long gun comprising:
 a cup for receiving the trigger guard of the long gun and restraining the long gun from rearward motion;
 a forward lock clamp for releasably engaging on the long gun, said forward lock clamp being attached to and spaced from said trigger guard cup, said forward lock clamp comprising a back panel and a flange attached to said back panel, said flange having a groove therein sized to receive a portion of the long gun forward of its receiver;
 a lock arm, said lock arm having a back flange movably mounted with respect to said back panel, said lock arm having a groove therein facing said groove in said body, said groove in said lock arm being sized to receive a portion of the long gun forward of its receiver, said trigger guard cup being spaced from said lock clamp such that, when the trigger guard of the long gun is in said trigger guard cup, the receiver of the long gun is against said lock clamp to prevent forward motion of the long gun, said lock arm being movably mounted with respect to said body for releasably retaining the long gun therebetween; and
 means for releasably locking said lock arm with respect to said body.

11. The mount of claim 10 wherein said means for releasably locking said lock arm with respect to said body comprises a pin engaging therebetween and a solenoid connected to said pin so that said pin can be withdrawn to release said lock arm with respect to said body.

12. The mount of claim 10 wherein said means for releasably locking said lock arm with respect to said body comprises a pin interengaged therebetween and a key lock engaged with said pin to withdraw said pin to release said lock arm with respect to said body.

13. The mount of claim 12 further including a solenoid connected to said pin to withdraw said pin from interengagement between said lock arm and said body.

14. The mount of claim 10 further including a spring engaged between said lock arm and said body to resiliently embrace said lock arm onto a long gun in said lock clamp, said spring being sufficiently strong to retain the long gun in said mount even when said locking means is disengaged.

15. The mount of claim 10 wherein one of said back flange and back panel has a slot therein and the other of said back flange and back panel has a slide engaging in said slot to slidably mount said lock arm with respect to said back panel.

16. The mount of claim 15 wherein said slot is a tee slot and said slide is a tee slide engaged therein to retain said lock arm with respect to said body.

17. The mount of claim 16 further including a spring engaged between said lock arm and said body to resiliently embrace said lock arm onto a long gun in said lock clamp, said spring being sufficiently strong to retain the long gun in said mount even when said locking means is disengaged.

18. The mount of claim 17 wherein said lock arm has a sloped surface thereon which engages the long gun as it is being released from said lock arm to smoothly release the long gun.

19. The mount of claim 18 wherein said means for releasably locking said lock arm with respect to said body comprises a pin engaging therebetween and a solenoid connected to said pin so that said pin can be withdrawn to release said lock arm with respect to said body.

* * * * *